(12) United States Patent
Hodgkins et al.

(10) Patent No.: US 12,435,279 B2
(45) Date of Patent: Oct. 7, 2025

(54) pH-MODIFIED WATER-SOLUBLE OXIDIZED DISULFIDE OIL COMPOSITIONS

(71) Applicant: Saudi Arabian Oil Company, Dhahran (SA)

(72) Inventors: Robert P. Hodgkins, Dhahran (SA); Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 661 days.

(21) Appl. No.: 17/850,158

(22) Filed: Jun. 27, 2022

(65) Prior Publication Data

US 2023/0416616 A1 Dec. 28, 2023

(51) Int. Cl.
*C10G 19/02* (2006.01)

(52) U.S. Cl.
CPC ....... *C10G 19/02* (2013.01); *C10G 2300/202* (2013.01); *C10G 2300/207* (2013.01)

(58) Field of Classification Search
CPC ............. C10G 19/02; C10G 2300/202; C10G 2300/207
See application file for complete search history.

(56) References Cited

U.S. PATENT DOCUMENTS

| | | | |
|---|---|---|---|
| 3,313,594 | A | 4/1967 | Wilson |
| 3,516,786 | A | 6/1970 | Maher et al. |
| 3,556,725 | A | 1/1971 | Chiola et al. |
| 5,763,720 | A | 6/1998 | Buchanan et al. |
| 5,951,962 | A | 9/1999 | Müller et al. |
| 6,337,063 | B1 | 1/2002 | Rouleau et al. |
| 7,923,522 | B2 | 4/2011 | Hamada et al. |
| 10,781,168 | B2 | 9/2020 | Koseoglu et al. |
| 10,793,782 | B2 | 10/2020 | Koseoglu et al. |
| 10,807,947 | B2 | 10/2020 | Koseoglu et al. |
| 10,927,318 | B2 | 2/2021 | Koseoglu et al. |
| 11,111,212 | B2 | 9/2021 | Koseoglu et al. |
| 11,649,405 | B1 | 5/2023 | Hodgkins et al. |
| 11,883,806 | B2 | 1/2024 | Hodgkins et al. |
| 11,958,751 | B2 | 4/2024 | Hodgkins et al. |
| 11,970,403 | B2 | 4/2024 | Hodgkins et al. |
| 2006/0254930 | A1 | 11/2006 | Martinie et al. |

(Continued)

FOREIGN PATENT DOCUMENTS

| | | |
|---|---|---|
| CN | 102452663 A | 5/2012 |
| CN | 103055933 A | 4/2013 |

(Continued)

OTHER PUBLICATIONS

Grabicka et al. "Microwave-assisted synthesis of periodic mesoporous organosilicas with ethane and disulfide groups." Microporous and Mesoporous Materials 119.1-3 (2009): 144-149.

(Continued)

*Primary Examiner* — Jiangtian Xu
(74) *Attorney, Agent, or Firm* — Leason Ellis LLP

(57) ABSTRACT

A composition of matter is provided including one or more water-soluble oxidized disulfide oil (WS-ODSO) compounds or mixture of compounds, and an effective amount of an alkaline agent. The composition is a pH-modified, that is, deacidified, neutralized or basified, WS-ODSO composition. The pH-modified WS-ODSO composition can be used as a component in synthesis of materials such as zeolitic materials.

22 Claims, 7 Drawing Sheets

(56) References Cited

U.S. PATENT DOCUMENTS

| | | | |
|---|---|---|---|
| 2015/0048006 A1 | 2/2015 | Zhang et al. | |
| 2017/0369790 A1 | 12/2017 | Gomach | |
| 2018/0312762 A1 | 11/2018 | Gomach | |
| 2020/0181073 A1 | 6/2020 | Koseoglu et al. | |
| 2020/0332201 A1 | 10/2020 | Koseoglu et al. | |
| 2020/0332202 A1 | 10/2020 | Hodgkins et al. | |
| 2020/0354638 A1 | 11/2020 | Koseoglu et al. | |
| 2020/0377451 A1* | 12/2020 | Koseoglu | C07C 315/02 |
| 2021/0071092 A1 | 3/2021 | Koseoglu et al. | |
| 2021/0171841 A1 | 6/2021 | Koseoglu et al. | |
| 2023/0331668 A1 | 10/2023 | Koseoglu et al. | |

FOREIGN PATENT DOCUMENTS

| | | | |
|---|---|---|---|
| CN | 106145134 A | 11/2016 | |
| CN | 107982540 A | 5/2018 | |
| EP | 0999183 B1 | 6/2003 | |
| WO | 2018202468 A1 | 11/2018 | |

OTHER PUBLICATIONS

Jin et al. "Gold nanoparticles stabilized in a novel periodic mesoporous organosilica of SBA-15 for styrene epoxidation." Microporous and Mesoporous Materials 111.1-3 (2008): 569-576.

Jo et al. "Synthesis of Silicate Zeolite Analogues Using Organic Sulfonium Compounds as Structure-Directing Agents." Angewandte Chemie International Edition 54.43 (2015). Wiley Online Library, 12996-12999. 14 total pages.

* cited by examiner pH-MODIFIED WATER-SOLUBLE OXIDIZED DISULFIDE OIL COMPOSITIONS

FIELD OF THE DISCLOSURE

The present disclosure relates to compositions that are useful as a component in manufacture of materials including zeolitic materials, made from refinery waste materials.

BACKGROUND OF THE DISCLOSURE

Within a typical refinery, there are by-product streams that must be treated or otherwise disposed of. The mercaptan oxidation process, commonly referred to as the MEROX process, has long been employed for the removal of the generally foul smelling mercaptans found in many hydrocarbon streams and was introduced in the refining industry over fifty years ago. Because of regulatory requirements for the reduction of the sulfur content of fuels for environmental reasons, refineries have been, and continue to be faced with the disposal of large volumes of sulfur-containing by-products. Disulfide oil (DSO) compounds are produced as a by-product of the MEROX process in which the mercaptans are removed from any of a variety of petroleum streams including liquefied petroleum gas, naphtha, and other hydrocarbon fractions. It is commonly referred to as a 'sweetening process' because it removes the sour or foul smelling mercaptans present in crude petroleum. The term "DSO" is used for convenience in this description and in the claims, and will be understood to include the mixture of disulfide oils produced as by-products of the mercaptan oxidation process. Examples of DSO include dimethyldisulfide, diethyldisulfide, and methylethyldisulfide.

The by-product DSO compounds produced by the MEROX unit can be processed and/or disposed of during the operation of various other refinery units. For example, DSO can be added to the fuel oil pool at the expense of a resulting higher sulfur content of the pool. DSO can be processed in a hydrotreating/hydrocracking unit at the expense of higher hydrogen consumption. DSO also has an unpleasant foul or sour smell, which is somewhat less prevalent because of its relatively lower vapor pressure at ambient temperature; however, problems exist in the handling of this oil.

Commonly owned U.S. Pat. No. 10,807,947 which is incorporated by reference herein in its entirety discloses a controlled catalytic oxidation of MEROX process by-products DSO. The resulting oxidized material is referred to as oxidized disulfide oil (ODSO). As disclosed in 10,807,947, the by-product DSO compounds from the mercaptan oxidation process can be oxidized, in the presence of a catalyst. The oxidation reaction products constitute an abundant source of ODSO compounds, sulfoxides, sulfonates, sulfinates and sulfones.

The ODSO stream so-produced contains ODSO compounds as disclosed in U.S. Pat. Nos. 10,781,168 and 11,111,212 as compositions (such as a solvent), in U.S. Pat. No. 10,793,782 as an aromatics extraction solvent, and in U.S. Pat. No. 10,927,318 as a lubricity additive, all of which are incorporated by reference herein in their entireties. In the event that a refiner has produced or has on hand an amount of DSO compounds that is in excess of foreseeable needs for these or other uses, the refiner may wish to dispose of the DSO compounds in order to clear a storage vessel and/or eliminate the product from inventory for tax reasons.

Thus, there is a clear and long-standing need to provide an efficient and economical process for the treatment of the large volumes of DSO by-products and their derivatives to effect and modify their properties in order to facilitate and simplify their environmentally acceptable disposal, and to utilize the modified products in an economically and environmentally friendly manner, and thereby enhance the value of this class of by-products to the refiner.

In regard to the above background information, the present disclosure is directed to provide a technical solution for a composition that is effective as a component in various synthesis processes, including synthesis of zeolitic materials.

SUMMARY OF THE DISCLOSURE

Embodiments herein provide a composition comprising an aqueous mixture of one or more water-soluble oxidized disulfide oil (WS-ODSO) compounds and an effective amount of an alkaline agent, wherein the composition is a pH-modified WS-ODSO composition having a pH that is higher than a pH of the one or more WS-ODSO compounds.

In certain embodiments, the one or more WS-ODSO compounds is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR) and mixtures thereof, where R and R' are C1-C10 alkyl or C6-C10 aryl groups. In certain embodiments, the one or more WS-ODSO compounds is selected from the group consisting of compounds having the general formula (R—SOO—SO—R'), (R—SOO—SOO—R'), (R—SO—SOO—OH), (R—SOO—SOO—OH), (R—SO—SO—OH), (R—SOO—SO—OH), and mixtures thereof, where R and R' are C1-C10 alkyl or C6-C10 aryl groups. In certain embodiments, the one or more WS-ODSO compounds comprises a mixture of two or more types of WS-ODSO compounds selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), where R and R' are C1-C10 alkyl or C6-C10 aryl groups. In certain embodiments, the one or more WS-ODSO compounds comprises a mixture of two or more types of WS-ODSO compounds selected from the group consisting of compounds having the general formula (R—SOO—SO—R'), (R—SOO—SOO—R'), (R—SO—SOO—OH), (R—SOO—SOO—OH), (R—SO—SO—OH), (R—SOO—SO—OH), and mixtures thereof, where R and R' are C1-C10 alkyl or C6-C10 aryl groups. In certain embodiments, the mixture is derived from oxidation of disulfide oil compounds present in an effluent refinery hydrocarbon stream recovered following catalytic oxidation of mercaptans present in a mercaptan-containing hydrocarbon stream.

In certain embodiments, the alkaline agent has a pH of greater than 7 or greater than or equal to about 8, and less than or equal to 14, and wherein the one or more WS-ODSO compounds have a pH of less than about 7, less than or equal to about 4 or less than or equal to about 1.

In certain embodiments, the alkaline agent is selected from the group consisting of sodium hydroxide, calcium hydroxide, lithium hydroxide, strontium hydroxide, barium hydroxide, potassium hydroxide, cesium hydroxide, rubidium hydroxide, ammonia, ammonium hydroxide, zinc hydroxide, trimethylamine, pyridine, beryllium hydroxide, magnesium hydroxide, and mixtures comprising two or more of the foregoing. In certain embodiments, the alkaline agent is sodium hydroxide.

In certain embodiments, the composition is a neutralized WS-ODSO composition having a pH in the range of about 6-8, 6.5-7.5, 6.8-7.2, 6.9-7.1 or 7. In certain embodiments, the effective amount of the alkaline agent is on a molar equivalent or approximately molar equivalent basis relative to the number of acid sites of the WS-ODSO compounds, and wherein the pH-modified WS-ODSO composition is a neutralized WS-ODSO composition. In certain embodiments, the effective amount of the alkaline agent is greater than a molar equivalent relative to the number of acid sites of the WS-ODSO compounds, and wherein the pH-modified WS-ODSO composition is a basified WS-ODSO composition. In certain embodiments, a basified WS-ODSO composition has a pH greater than 7, 8, 9 or 10. In certain embodiments, the effective amount of the alkaline agent is less than a molar equivalent relative to the number of acid sites of the WS-ODSO compounds, and wherein the pH-modified WS-ODSO composition is a deacidified WS-ODSO composition. In certain embodiments, a deacidified WS-ODSO composition has a pH less than 5, 6 or 7.

In certain embodiments, all or a portion of water in the aqueous mixture is generated in-situ by reaction of WS-ODSO and alkaline agent. In certain embodiments, the oxidation of disulfide oil compounds occurs in the presence of a transition metal catalyst, and wherein the pH-modified WS-ODSO contains transition metal from the transition metal catalyst. In certain embodiments, the transition metal catalyst is selected from the group consisting of Mo, W, V, Ti, and combinations thereof. In certain embodiments, the composition further comprises one or more active components. In certain embodiments, the WS-ODSO contains one or more active components is contained in a mixture with the WS-ODSO at a first concentration, and wherein a concentration of the one or more active components pH-modified WS-ODSO is less than the first concentration. In certain embodiments, the WS-ODSO contains a first weight percent of atomic sulfur, and the pH-modified WS-ODSO composition contains a lesser weight percent of atomic sulfur than the first quantity of atomic sulfur. In certain embodiments, the alkaline agent comprises an alkali metal, the WS-ODSO contains a first weight percent of atomic alkali metal, and the pH-modified WS-ODSO composition contains a greater weight percent of atomic alkali metal than the first quantity of atomic alkali metal.

Any combinations of the various embodiments and implementations disclosed herein can be used. These and other aspects and features can be appreciated from the following description of certain embodiments and the accompanying drawings and claims.

BRIEF DESCRIPTION OF THE DRAWINGS

The process of the disclosure will be described in more detail below and with reference to the attached drawings.

DETAILED DESCRIPTION OF CERTAIN EMBODIMENTS OF THE DISCLOSURE

Figure 1:
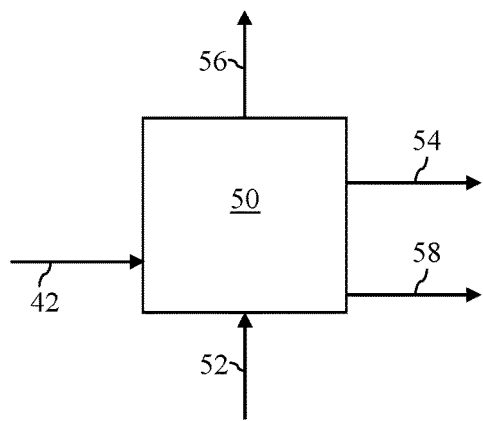
FIG. 1 is a simplified schematic diagram of a method described herein for pH-modification of WS-ODSO.

Compositions of matter are provided including one or more water-soluble oxidized disulfide oil (WS-ODSO) compounds or mixture of compounds, and an effective amount of an alkaline agent. The compositions are pH-modified, that is, deacidified, neutralized or basified, WS-ODSO compositions, and are formed by method disclosed, for example, in co-pending and commonly owned United Stated patent application Ser. No. 17/850,219 filed on Jun. 27, 2022, entitled "Methods Of Modifying pH Of Water-Soluble Oxidized Disulfide Oil," which is incorporated by reference herein in its entirety. The pH-modified WS-ODSO composition can be used as a component in synthesis of zeolitic or other materials (as disclosed in co-pending and commonly owned United Stated patent application Ser. No. 17/850,115 filed on Jun. 27, 2022, entitled "Method Of Zeolite Synthesis Including pH-Modified Water-Soluble Oxidized Disulfide Oil Composition," and in co-pending and commonly owned United Stated patent application Ser. No. 17/850,285 filed on Jun. 27, 2022, entitled "Method Of Synthesizing Materials Integrating Supernatant Recycle," which are both incorporated by reference herein in their entireties). Advantageously, the compositions can be used in their own right as reagents. In certain embodiments the compositions herein reduce water waste and reduce the need to procure separate reagents. In certain embodiments the compositions herein reduce DSO waste from a refinery and its discharge into the environment. In certain embodiments the compositions herein use materials previously considered waste materials, DSO, which are converted by controlled catalytic oxidation into ODSO, wherein the compositions include ODSO as a component in reagents that are considered commodities.

The WS-ODSO is acidic in nature (as disclosed in co-pending and commonly owned United Stated patent application Ser. No. 17/720,702 filed Apr. 14, 2022, entitled "ODSO Acid Medium, ODSO ACID Mixture Medium, and Uses Thereof," which is incorporated by reference herein in its entirety). The acidic WS-ODSO (in particular containing 3 or more oxygen atoms) derived from controlled catalytic oxidation of MEROX process by-products DSO (also referred to herein as the E-MEROX process) is modified by mixing it with a caustic material as an alkaline agent. In certain embodiments, the concentration of acid cites in WS-ODSO is in the range of about 0.0068-0.0078, 0.0070-0.0076, 0.0071-0.0075, 0.0072-0.0074 or about 0.0073 moles of protons per gram of WS-ODSO. In certain embodiments, acidic WS-ODSO is neutralized, for example to a value of pH 7 or approximately pH 7, by contacting with an effective quantity of an alkaline agent, for example, on a molar equivalent or approximately molar equivalent basis relative to the number of acid sites of the total WS-ODSO. In certain embodiments, acidic WS-ODSO is deacidified, for example to a level that is less than a pH 7 but greater than the pH of the initial acidic WS-ODSO, by contacting with an effective quantity of an alkaline agent, for example, less than a molar equivalent basis relative to the number of acid sites of the total WS-ODSO. In certain embodiments, acidic WS-ODSO is basified, for example to a level that is greater than a pH 7, by contacting with an effective quantity of an alkaline agent, for example, greater than a molar equivalent basis relative to the number of acid sites of the total WS-ODSO. Accordingly, a resulting pH-modified WS-ODSO mixture can be used in other applications. In certain embodiments, use of the pH-modified WS-ODSO replaces all or a portion of "free" utility water in a typical synthesis system. In certain embodiments, use of the pH-modified WS-ODSO replaces all or a portion of alkaline reagent necessary in a typical synthesis system.

In certain embodiments, a composition of matter is provided as an aqueous liquid mixture comprising one or more WS-ODSO compounds and an alkaline agent, as a pH-modified WS-ODSO composition. In certain embodiments the composition comprises a deacidified WS-ODSO composition that has an acidic pH that is higher than that of the initial WS-ODSO, wherein reduction in acidity is influenced by the amount of alkaline agent in the composition and wherein the amount of alkaline agent in the composition is less than a molar equivalent of OH relative to a number of acid sites of the WS-ODSO. In certain embodiments of a deacidified WS-ODSO composition the pH thereof is less than about 5, 6 or 7, for example in the range of about 1-7, 2-7, 3-7, 1-6, 2-6, 3-6, 1-5, 2-5 or 3-5. In certain embodiments the composition comprises a neutralized WS-ODSO composition that is neutral or approximately neutral in pH, wherein the amount of alkaline agent in the composition is approximately a molar equivalent of OH relative to a number of acid sites of the WS-ODSO. In certain embodiments of the composition the pH thereof in the range of about 6-8, 6.5-7.5, 6.8-7.2, 6.9-7.1 or 7. In certain embodiments the composition comprises a basified WS-ODSO composition that has a basic pH, wherein basicity is influenced by the amount of alkaline agent in the composition and wherein the amount of alkaline agent in the composition is greater than a molar equivalent of OH relative to a number of acid sites of the WS-ODSO. In certain embodiments of a basified WS-ODSO composition the pH thereof is greater than 7, 8, 9 or 10, for example in the range of about 7.1-14, 7.5-14 or 8-14.

In the herein compositions, an alkaline agent is basic and the WS-ODSO is acidic. In certain embodiments of above compositions, the alkaline agent has a pH of greater than 7, greater than or equal to about 8, and the one or more WS-ODSO compounds have a pH of less than about 7, less than or equal to about 4 or less than or equal to about 1.

WS-ODSO and alkaline agent are subjected to reaction to provide the aqueous liquid mixture having a pH that is higher than a pH of the one or more WS-ODSO compounds. In certain embodiments WS-ODSO and alkaline agent are subjected to reaction to neutralize or approximately neutralize the acid contribution of the WS-ODSO compounds to pH in the range of about 6-8, 6.5-7.5, 6.8-7.2, 6.9-7.1 or 7. In certain embodiments, the reaction induces in-situ formation of water, for example by acid and base reaction to neutralize both and produce a salt and water. In certain embodiments, the reaction induces gas formation.

In certain embodiments, the reaction induces precipitation of solids. In certain embodiments, the reaction induces precipitation of solids and in-situ formation of water. In certain embodiments, the reaction induces precipitation of a solid, in-situ formation of water and liberation of gases, for instance, steam and sulfur-containing gases. In certain embodiments solids comprise sulfur from the WS-ODSO compound(s). In certain embodiments solids comprise is a salt that is produced with water in the acid-base reaction, for example an alkali metal of the alkaline agent. In certain embodiments solids comprise transition metals derived from transition metal catalysts used in oxidation of DSO compound(s), which are contained in the WS-ODSO mixture. In certain embodiments a homogeneous tungsten catalyst is used in oxidation of DSO compound(s) to produce the WS-ODSO and is in a mixture therewith; and it is observed that the system transforms from clear to cloudy as the amount of alkaline agent is increased; solid can be suspended in the solution when it is observed as cloudy and prior to precipitation. In certain embodiments in which other types of homogeneous catalyst are used or heterogeneous catalysts are used in the oxidation of DSO compound(s) solids can precipitate at different rates, or not precipitate during the pH-modification herein. Solids that can be formed during pH-modification can contain one or more of: sulfates of a metal used in the alkaline agent, for example sodium sulfate; sulfonates of a metal used in the alkaline agent, for example sodium sulfonates; carry over catalyst from the oxidation of DSO to WS-ODSO, for example sodium tungstate; and/or hydrate derivatives or sulfur-containing derivatives derived from an alkaline agent and/or carryover of catalysts that are used in the oxidation of DSO compound(s).

In certain embodiments, the reaction of WS-ODSO and alkaline agent occurs at a temperature in the range of about 15-99, 15-45, 15-35, 20-99, 20-45 or 20-35° C. In certain embodiments, the reaction of WS-ODSO and alkaline agent occurs at a starting temperature in the range of about 20-45 or 20-35° C. The reaction is exothermic when the alkaline agent is added to WS-ODSO, and locally the temperature increases to induce a degree of evaporation. In certain embodiments measures are taken to control the effluent temperature. In certain embodiments measures are taken to control the reaction temperature to maintain it with the range of about 20-45 or 20-35° C. In certain embodiments, the reaction of WS-ODSO and alkaline agent occurs at a pressure that is about atmospheric pressure, under vacuum or in the range of about 1-10 bar. In certain embodiments, the reaction of WS-ODSO and alkaline agent occurs at a pressure that is at or about atmospheric. The molar feed ratio of alkaline agent to WS-ODSO is suitable to result in a desired pH-modified WS-ODSO composition, that is, deacidified, neutralized or basified, as disclosed herein. The residence time in the reaction vessel is suitable to complete reactions between the alkaline agent and WS-ODSO to result in a desired pH-modified WS-ODSO composition, that is, deacidified, neutralized or basified, and can be for example in the range of from about 1-240, 1-120, 1-60 or 1-30 minutes.

In certain embodiments, the reaction of WS-ODSO and alkaline agent occurs in the absence of added heat. In certain embodiments the reaction is exothermic, for example where the produced aqueous liquid mixture with cooling has a temperature in the range of about 20-80, 20-70, 20-65, 30-80, 30-70, 30-65, 35-80, 35-70 or 35-65° C. (in the overall effluent rather than locally where in instances the temperature is sufficiently high to cause a degree of evaporation). In certain embodiments the reaction of WS-ODSO and alkaline agent is exothermic, and a cooling step is integrated to reduce the temperature of the produced aqueous liquid mixture, for example to a temperature suitable for storage and handling such as 15-45, 15-35, 20-45 or 20-35° C. This can be accomplished with known reaction equipment, including but not limited to an air cooler, water cooler or a chiller. In certain embodiments the hot produced aqueous liquid mixture is cooled with an indirect heat exchanger and the heat energy is transferred to another fluid, for example water to produce heated water or steam, or another reactant; suitable indirect heat exchangers include but are not limited to a shell and tube heat exchanger, double pipe heat exchanger or plate heat exchanger.

For example, with reference to FIG. 1, a reaction vessel 50 is provided, for example generally selected from one or more of a fixed-bed reactor, an ebullated bed reactor, a slurry bed reactor, a moving bed reactor, a continuous stirred tank reactor, and a tubular reactor. The reaction vessel 50 includes: one or more inlets in fluid communication with a source of, and configured and arranged for receiving, an effective amount of WS-ODSO, influent stream 42; one or more inlets in fluid communication with a source of, and configured and arranged for receiving an effective amount of, alkaline agent, influent stream 52; and one or more outlets for discharging a composition having an increased pH relative to the influent WS-ODSO, effluent stream 54. In addition, gases are discharged, typically as byproduct, effluent stream 56. Further, as explained herein solids can be formed during reaction of WS-ODSO and alkaline agent; these can be removed from the system, represented by stream 58 (which can be removed continuously, semi-continuously or in batch).

As explained herein, depending on the amount of alkaline agent used, the pH level of the effluent stream 54 is greater than the pH of the influent WS-ODSO, but the ultimate level can vary. In certain embodiments the PH level of the effluent stream 54 is neutral or approximately neutral pH. In certain embodiments the PH level of the effluent stream 54 is deacidified relative to the influent WS-ODSO. In certain embodiments the PH level of the effluent stream 54 is basic.

The alkaline agent in the compositions herein in general can be a suitable basic component that, when added to the WS-ODSO component, results in an increase in the pH value of a resulting solution. Typically, an alkaline agent is provided as an aqueous basic solution, for example having concentrations in the range of about 1-99, 1-70, 1-50, 5-99, 5-70, 5-50, 10-99, 10-70 or 1-50 mass percent of base compounds. In certain embodiments the WS-ODSO is provided in an aqueous medium, there is sufficient water to dissolve an alkaline agent provided in anhydrous form.

The amount of alkaline is provided that is sufficient, on a mole to mole basis, to produce a composition of WS-ODSO and alkaline agent having a pH value that is greater than the pH value of the initial WS-ODSO mixture, in certain embodiments to a pH that is neutral (7) or approximately neutral. It is to be appreciated that this is expressed herein in an embodiment as a mass percent, but that can vary based on factors including but not limited to the specific composition of the ODSO mixture and the concentration and selection of the alkaline agent.

In certain embodiments, an effective amount of the alkaline agent is added produce a composition of WS-ODSO and alkaline agent having a pH value that is greater than the pH value of the initial WS-ODSO mixture; for example, an effective amount in such embodiments 10-99% of a molar equivalent to number of acid sites of the total WS-ODSO. In such a manner, the pH of the produced aqueous solution of WS-ODSO and alkaline agent can be tailored to a particular end-use, for instance with a pH curve developed with empirical data for a given WS-ODSO composition and a selected alkaline agent.

In certain embodiments, an effective amount of the alkaline agent is added produce a composition of WS-ODSO and alkaline agent having a pH value that is neutral or approximately neutral. In certain embodiments, an effective amount of the alkaline agent is added produce a composition of WS-ODSO and alkaline agent having a pH value that is in the range of about 6-8, 6.5-7.5, 6.8-7.2, 6.9-7.1 or 7. For example, an effective amount of alkaline agent used can be such that the hydronium ions in the system must have a concentration between about $10^{-6}$ to $10^{-8}$ molar (M). For instance, for a WS-ODSO composition derived from controlled catalytic oxidation of DSO compounds from a MEROX process, the composition of WS-ODSO and alkaline agent comprises about 18.4 to 18.5 mass percent of alkaline agent (relative to the mass of the total composition) to attain a pH in the range of about 6-8.

In certain embodiments, an alkaline agent in the compositions herein is a base selected from the group consisting of sodium hydroxide, calcium hydroxide, lithium hydroxide, strontium hydroxide, barium hydroxide, potassium hydroxide, cesium hydroxide, rubidium hydroxide, ammonia, ammonium hydroxide, zinc hydroxide, trimethylamine, pyridine, beryllium hydroxide, magnesium hydroxide, and mixtures thereof. In certain embodiments, an alkaline agent in the compositions herein is a strong base, for example, selected from the group consisting of sodium hydroxide, calcium hydroxide, lithium hydroxide, strontium hydroxide, barium hydroxide, potassium hydroxide, cesium hydroxide, rubidium hydroxide, and mixtures thereof. In certain embodiments, an alkaline agent in the compositions herein is a weak base, selected from the group consisting of ammonia, ammonium hydroxide, lithium hydroxide, zinc hydroxide, trimethylamine, pyridine, and mixtures thereof. In certain embodiments, other bases can be used as an alkaline agent in the compositions herein, for example selected from the group consisting of beryllium hydroxide, magnesium hydroxide, and mixtures thereof. In certain embodiments, an alkaline agent in the compositions herein is selected from the group consisting of sodium hydroxide, potassium hydroxide, ammonium hydroxide and mixtures thereof. In certain embodiments, an alkaline agent in the methods and compositions herein is selected from the group consisting of sodium hydroxide, potassium hydroxide, rubidium hydroxide, lithium hydroxide, cesium hydroxide, and mixtures thereof.

A composition of matter is provided as an aqueous liquid mixture comprising one or more WS-ODSO compounds and an alkaline agent. In certain embodiments the composition is neutral or approximately neutral in pH. In certain embodiments of the composition the pH thereof in the range of about 6-8, 6.5-7.5, 6.8-7.2, 6.9-7.1 or 7. In certain embodiments the composition comprises deacidified WS-ODSO that has an acidic pH that is higher than that of the initial WS-ODSO; for example, if the initial WS-ODSO has a pH of 1, the deacidified WS-ODSO has a pH of 1.1 or greater, up to about neutral, for example 1.1-8, 1.1-7.5, 1.1-7.0, 1.1-6.9 or 1.1-6.5. In certain embodiments the composition comprises basified WS-ODSO that has a basic pH, for instance greater than 7, for example 7.1-14, 7.5-14 or 8-14.

In certain embodiments, the initial WS-ODSO used in the pH-modified WS-ODSO composition contains a first weight percent of atomic sulfur, and the pH-modified WS-ODSO composition contains a lesser weight percent of atomic sulfur than the first quantity of atomic sulfur. In certain embodiments, the alkaline agent comprises an alkali metal (such as Li, Na, K, Rb or Cs), the initial WS-ODSO used in the pH-modified WS-ODSO composition contains a first weight percent of atomic alkali metal, and the pH-modified WS-ODSO composition contains a greater weight percent of atomic alkali metal than the first quantity of atomic alkali metal.

In certain embodiments, the one or more WS-ODSO compounds are contained in a mixture with one or more catalytically active components and WS-ODSO, as an active component carrier composition (as disclosed in co-pending and commonly owned United Stated patent application Ser. No. 17/720,434 filed Apr. 14, 2022, entitled "Active Component Carrier Composition, and Method for Manufacture of Catalyst Materials," which is incorporated by reference herein in its entirety). One or more catalytically active components are included in a mixture with one or more WS-ODSO compounds. The one or more active components can vary, depending upon the application of the catalyst being manufactured. The active component can be a metal or a non-metal, in elemental form or as a compound such as oxides, carbides or sulfides. For instance, one or more active components for hydrotreating catalysts can include one or more metals or metal compounds selected from the Periodic Table of the Elements IUPAC Groups 4-12. In certain embodiments one or more active components are selected for producing hydrotreating catalysts and can include one or more metals or metal compounds selected from the Periodic Table of the Elements IUPAC Groups 6-10 (for example Co, Ni, Mo, and combinations thereof). In certain embodiments one or more active components are selected for producing hydrocracking catalysts and can include one or more metals or metal compounds selected from the Periodic Table of the Elements IUPAC Groups 6-10 (for example Co, Ni, W, Mo, and combinations thereof). In certain embodiments one or more active components are selected for producing catalytic reforming catalysts and can include one or more metals or metal compounds selected from the Periodic Table of the Elements IUPAC Groups 8-10 (for example Pt or Pd). In certain embodiments one or more active components are selected for producing hydrogenation catalysts and can include one or more metals or metal compounds selected from the Periodic Table of the Elements IUPAC Groups 7-10 (for example Pt or Pd), and/or one or more non-metal compound such as P. In certain embodiments one or more active components are selected for producing oxidation catalysts and can include one or more metals or metal compounds selected from the Periodic Table of the Elements IUPAC Groups 4-10 (for example Ti, V, Mn, Co, Fe, Cr and Mo) or from the Periodic Table of the Elements IUPAC Groups 4-12 (for example Ti, V, Mn, Co, Fe, Cr, Cu, Zn, W, Mo).

In certain embodiments, active component(s) in the WS-ODSO mixture are carried over from the preceding catalytic oxidation of MEROX process by-products DSO, and accordingly the concentration depends on the amount used therein. In certain embodiments, catalytic oxidation of MEROX process by-products DSO can occur with an increased amount of oxidation catalyst compared to that which is typically used, wherein excess is passed with the ODSO or WS-ODSO fraction and used herein as active components in the WS-ODSO mixture herein.

In certain embodiments, the produced aqueous liquid mixture comprises one or more WS-ODSO compounds that are contained in reaction products, or a fraction of reaction products, derived from controlled catalytic oxidation of disulfide oil compounds in the presence of an oxidation catalyst containing one or more transition metals. For example, as described above and in commonly owned U.S. Pat. No. 10,807,947 which is incorporated by reference herein in its entirety, a controlled catalytic oxidation of MEROX process by-products DSO can be carried out. The resulting oxidized effluents contain ODSO. As disclosed in 10,807,947, the by-product DSO compounds from the mercaptan oxidation process can be oxidized, typically in the presence of a catalyst. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. In embodiments herein, a catalyst is used in the oxidation process. The oxidation catalyst can contain one active metals from IUPAC Groups 4-10 or from Groups 4-12 of the Periodic Table. In certain embodiments oxidation catalyst are metals or metal compounds containing one or more transition metals. In certain embodiments oxidation catalyst are metals or metal compounds containing one or more metals selected from the group consisting of Ti, V, Mn, Co, Fe, Cr, Cu, Zn, W, Mo and combinations thereof. In certain embodiments oxidation catalyst are compounds containing one or more metals or metal compounds selected from the group consisting of Mo, W, V, Ti, and combinations thereof. In certain embodiments oxidation catalyst are compounds containing one or more metals or metal compounds selected from the group consisting of Mo (VI), W (VI), V (V), Ti (IV), and combinations thereof. In certain embodiments, suitable homogeneous catalysts include molybdenum acetylacetonate, bis(acetylacetonate) dioxomolybdenum, molybdenum naphthenate, molybdenum hexacarbonyl, tungsten hexacarbonyl, sodium tungstate and vanadium pentoxide. In certain embodiments, a suitable catalyst is sodium tungstate, $Na_2WO_4 \cdot 2H_2O$.

In certain embodiments, the initial WS-ODSO used in the pH-modified WS-ODSO composition contains a first weight percent of active component(s) including metals such as transition metals, and the pH-modified WS-ODSO composition contains a lesser weight percent of active component(s) than the first quantity of active component(s).

The present disclosure includes one or more WS-ODSO compounds that are used as in the method to produce pH-modified WS-ODSO. The starting WS-ODSO acid or WS-ODSO acid mixture has a pH of less than 7, less than or equal to 4, or less than or equal to 1, and comprises two or more ODSO compounds. In the description herein, the terms "oxidized disulfide oil", "ODSO", "ODSO mixture" and "ODSO compound(s)" may be used interchangeably for convenience. As used herein, the abbreviations of oxidized disulfide oils ("ODSO") and disulfide oils ("DSO") will be understood to refer to the singular and plural forms, which may also appear as "DSO compounds" and "ODSO compounds," and each form may be used interchangeably. In certain instances, a singular ODSO compound may also be referenced.

In the process herein, an effective amount of one or more WS-ODSO compounds are a component to produce a composition, in the form of an aqueous mixture, of the one or more WS-ODSO compounds and an alkaline agent. The composition is used, for instance, in synthesis of various materials including zeolitic materials. In certain embodiments the composition of the one or more WS-ODSO compounds and alkaline agent is used as a replacement for added utility water. The effective amount of WS-ODSO in the composition, relative to the alkaline agent, is dependent various factors including the desired use of the composition. For example, in certain embodiments the effective amount of WS-ODSO can be that which is suitable to achieve similar pH levels as a conventional component being replaced in a synthesis process, for example where the conventional component being replaced is an acid such as hydrochloric acid. In certain embodiments, for example where the component being replaced is water, the effective amount of WS-ODSO is that which maintains a phase boundary of a sol-gel composition for a desired zeolite framework type having an equivalent amount of water being replaced. In certain embodiments, for example where the component being replaced is water, the effective amount of WS-ODSO is that which shifts a phase boundary of a sol-gel composition to a desired zeolite framework type having an equivalent amount of water being replaced, even using compositional ratios and conditions (other than the WS-ODSO) typically effective for synthesis of a different type of zeolite or that would typically produce amorphous material.

In certain embodiments WS-ODSO is obtained from controlled catalytic oxidation of disulfide oils from mercaptan oxidation processes. The effluents from controlled catalytic oxidation of disulfide oils from mercaptan oxidation processes includes ODSO compounds and in certain embodiments DSO compounds that were unconverted in the oxidation process. In certain embodiments this effluent contains water-soluble compounds and water-insoluble compounds. The effluent contains at least one ODSO compound, or a mixture of two or more ODSO compounds, selected from the group consisting of compounds having the general formula (R—SO—S—R'), (R—SOO—S—R'), (R—SOO—SO—R'), (R—SOO—SOO—R'), (R—SO—SO—R'), (R—SO—SOO—OH), (R—SOO—SOO—OH), (R—SO—SO—OH), (R—SOO—SO—OH), R'—SO—SO—OR), (R'—SOO—SO—OR), (R'—SO—SOO—OR) and (R'—SOO—SOO—OR). In certain embodiments, in the above formulae R and R' are C1-C10 alkyl or C6-C10 aryl groups. It will be understood that since the source of the DSO is a refinery feedstream, the R substituents vary, e.g., methyl and ethyl subgroups, and the number of sulfur atoms, S, in the as-received feedstream to oxidation can extend to 3, for example, trisulfide compounds.

In embodiments herein the water-soluble compounds and water-insoluble compounds are separated from one another, and WS-ODSO used herein comprises all or a portion of the water-soluble compounds separated from the total effluents from oxidation of disulfide oils from mercaptan oxidation processes. For example, the different phases can be separated by decantation or partitioning with a separating funnel, separation drum, by decantation, or any other known apparatus or process for separating two immiscible phases from one another. In certain embodiments, the water-soluble and water-insoluble components can be separated by distillation as they have different boiling point ranges. It is understood that there will be crossover of the water-soluble and water-insoluble components in each fraction due to solubility of components, typically in the ppmw range (for instance, about 1-10,000, 1-1,000, 1-500 or 1-200 ppmw). In certain embodiments, contaminants from each phase can be removed, for example by stripping or adsorption.

In certain embodiments WS-ODSO used herein comprises, consists of or consists essentially of at least one WS-ODSO compound having 3 or more oxygen atoms that is selected from the group consisting of compounds having the general formula (R—SOO—SO—R'), (R—SOO—SOO—R'), (R—SO—SOO—OH), (R—SOO—SOO—OH), (R—SOO—SO—OH), ((R'—SO—SO—OR), (R'—SOO—SO—OR), (R'—SO—SOO—OR) and (R'—SOO—SOO—OR). In certain embodiments WS-ODSO used herein comprises, consists of or consists essentially of a mixture or two or more WS-ODSO compounds having 3 or more oxygen atoms, that is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR). In certain embodiments WS-ODSO used herein comprises, consists of or consists essentially of WS-ODSO compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), and mixtures thereof. In certain embodiments, in the above formulae R and R' are C1-C10 alkyl or C6-C10 aryl groups. In certain embodiments, the R and R' are methyl and/or ethyl groups. In certain embodiments, the WS-ODSO compound(s) used herein have 1 to 20 carbon atoms.

In certain embodiments, the WS-ODSO compounds used herein comprise, consist of or consist essentially of ODSO compounds having an average density greater than about 1.0 g/cc. In certain embodiments, the WS-ODSO compounds used herein comprise, consist of or consist essentially of ODSO compounds having an average boiling point greater than about 80° C. In certain embodiments, the WS-ODSO compounds used herein comprise, consist of or consist essentially of ODSO compounds having a dielectric constant that is less than or equal to 100 at 0° C.

Table 1 includes examples of polar WS-ODSO compounds that contain 3 or more oxygen atoms. In certain embodiments the identified ODSO compounds are obtained from a water-soluble fraction of the effluents from oxidation of DSO obtained from MEROX by-products. The ODSO compounds that contain 3 or more oxygen atoms are water-soluble over effectively all concentrations, for instance, with some minor amount of acceptable tolerance for carry over components from the effluent stream and in the water insoluble fraction with 2 oxygen atoms of no more than about 1, 3 or 5 mass percent.

In certain embodiments the WS-ODSO compounds contained in an oxidation effluent stream that is derived from controlled catalytic oxidation of MEROX process by-products, DSO compounds, as disclosed in U.S. Pat. Nos. 10,807,947 and 10,781,168 and as incorporated herein by reference above.

In some embodiments, the WS-ODSO are derived from oxidized DSO compounds present in an effluent refinery hydrocarbon stream recovered following the catalytic oxidation of mercaptans present in the hydrocarbon stream. In some embodiments, the DSO compounds are oxidized in the presence of a catalyst.

As noted above, the designation "MEROX" originates from the function of the process itself, that is, the conversion of mercaptans by oxidation. The MEROX process in all of its applications is based on the ability of an organometallic catalyst in a basic environment, such as a caustic, to accelerate the oxidation of mercaptans to disulfides at near ambient temperatures and pressures. The overall reaction can be expressed as follows:

$$RSH + \tfrac{1}{4} O_2 \rightarrow \tfrac{1}{2} RSSR + \tfrac{1}{2} H_2O \qquad (1)$$

where R is a hydrocarbon chain that may be straight, branched, or cyclic, and the chains can be saturated or unsaturated. In most petroleum fractions, there will be a mixture of mercaptans so that the R can have 1, 2, 3 and up to 10 or more carbon atoms in the chain. This variable chain length is indicated by R and R' in the reaction. The reaction is then written:

$$2R'SH + 2RSH + O_2 \rightarrow 2R'SSR + 2H_2O \qquad (2)$$

This reaction occurs spontaneously whenever any sour mercaptan-bearing distillate is exposed to atmospheric oxygen, but proceeds at a very slow rate. In addition, the catalyzed reaction (3) set forth above requires the presence of an alkali caustic solution, such as aqueous sodium hydroxide. The mercaptan oxidation proceeds at an economically practical rate at moderate refinery downstream temperatures.

The MEROX process can be conducted on both liquid streams and on combined gaseous and liquid streams. In the case of liquid streams, the mercaptans are converted directly to disulfides which remain in the product so that there is no reduction in total sulfur content of the effluent stream. The MEROX process typically utilizes a fixed bed reactor system for liquid streams and is normally employed with charge stocks having end points above 135° C.-150° C. Mercaptans are converted to disulfides in the fixed bed reactor system over a catalyst, for example, an activated charcoal impregnated with the MEROX reagent, and wetted with caustic solution. Air is injected into the hydrocarbon feedstream ahead of the reactor and in passing through the catalyst-impregnated bed, the mercaptans in the feed are oxidized to disulfides. The disulfides are substantially insoluble in the caustic and remain in the hydrocarbon phase. Post treatment is required to remove undesirable by-products resulting from known side reactions such as the neutralization of $H_2S$, the oxidation of phenolic compounds, entrained caustic, and others.

The vapor pressures of disulfides are relatively low compared to those of mercaptans, so that their presence is much less objectionable from the standpoint of odor; however, they are not environmentally acceptable due to their sulfur content and their disposal can be problematical.

In the case of mixed gas and liquid streams, extraction is applied to both phases of the hydrocarbon streams. The degree of completeness of the mercaptan extraction depends upon the solubility of the mercaptans in the alkaline solution, which is a function of the molecular weight of the individual mercaptans, the extent of the branching of the mercaptan molecules, the concentration of the caustic soda and the temperature of the system. Thereafter, the resulting DSO compounds are separated and the caustic solution is regenerated by oxidation with air in the presence of the catalyst and reused.

Figure 2:
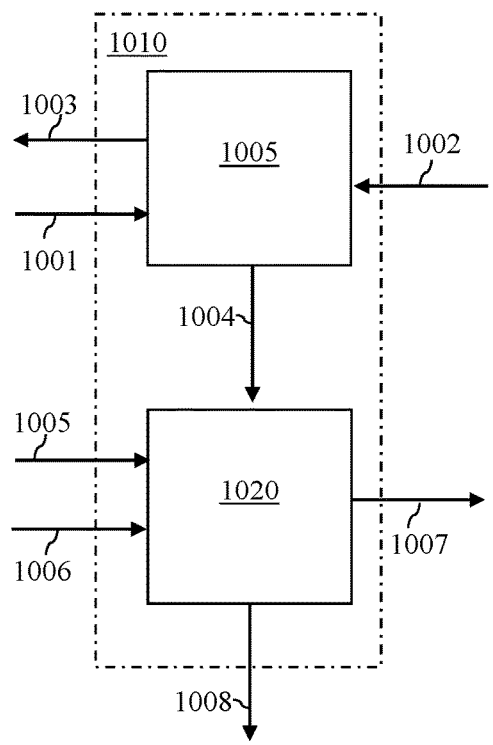
FIG. 2 is a simplified schematic diagram of a generalized version of a conventional mercaptan oxidation or MEROX process for the liquid-liquid extraction of a mercaptan containing hydrocarbon stream.

Referring to the attached drawings, FIG. 2 is a simplified schematic of a generalized version of a conventional MEROX process employing liquid-liquid extraction for removing sulfur compounds. A MEROX unit 1010, is provided for treating a mercaptan containing hydrocarbon stream 1001. In some embodiments, the mercaptan containing hydrocarbon stream 1001 is LPG, propane, butane, light naphtha, kerosene, jet fuel, or a mixture thereof. The process generally includes the steps of: introducing the hydrocarbon stream 1001 with a homogeneous catalyst into an extraction vessel 1005 containing a caustic solution 1002, in some embodiments, the catalyst is a homogeneous cobalt-based catalyst; passing the hydrocarbon catalyst stream in counter-current flow through the extraction section of the extraction 1005 vessel in which the extraction section includes one or more liquid-liquid contacting extraction decks or trays (not shown) for the catalyzed reaction with the circulating caustic solution to convert the mercaptans to water-soluble alkali metal alkane thiolate compounds; withdrawing a hydrocarbon product stream 1003 that is free or substantially free of mercaptans from the extraction vessel 1005, for instance, having no more than about 1000, 100, 10 or 1 ppmw mercaptans; recovering a combined spent caustic and alkali metal alkane thiolate stream 1004 from the extraction vessel 1005; subjecting the spent caustic and alkali metal alkane thiolate stream 1004 to catalyzed wet air oxidation in a reactor 1020 into which is introduced catalyst 1005 and air 1006 to provide the regenerated spent caustic 1008 and convert the alkali metal alkane thiolate compounds to disulfide oils; and recovering a by-product stream 1007 of DSO compounds and a minor proportion of other sulfides such as mono-sulfides and tri-sulfides. The effluents of the wet air oxidation step in the MEROX process can comprise a minor proportion of sulfides and a major proportion of disulfide oils. As is known to those skilled in the art, the composition of this effluent stream depends on the effectiveness of the MEROX process, and sulfides are assumed to be carried-over material. A variety of catalysts have been developed for the commercial practice of the process. The efficiency of the MEROX process is also a function of the amount of $H_2S$ present in the stream. It is a common refinery practice to install a prewashing step for $H_2S$ removal.

An enhanced MEROX process ("E-MEROX") is a modified MEROX process where an additional step is added, in which DSO compounds are oxidized with an oxidant in the presence of a catalyst to produce a mixture of ODSO compounds. The by-product DSO compounds from the mercaptan oxidation process are oxidized, in some embodiments in the presence of a catalyst, and constitute an abundant source of ODSO compounds that are sulfoxides, sulfonates, sulfinates, sulfones and their corresponding di-sulfur mixtures. The disulfide oils having the general formula RSSR' (wherein R and R' can be the same or different and can have 1, 2, 3 and up to 10 or more carbon atoms) can be oxidized without a catalyst or in the presence of one or more catalysts to produce a mixture of ODSO compounds. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. If a catalyst is used in the oxidation of the disulfide oils having the general formula RSSR' to produce the ODSO compounds, it can be a heterogeneous or homogeneous oxidation catalyst. The oxidation catalyst can be selected from one or more heterogeneous or homogeneous catalyst comprising metals from the IUPAC Group 4-12 of the Periodic Table, including Ti, V, Mn, Co, Fe, Cr, Cu, Zn, W and Mo. The catalyst can be a homogeneous water-soluble compound that is a transition metal containing an active species selected from the group consisting of Mo (VI), W (VI), V (V), Ti (IV), and combinations thereof. In certain embodiments, suitable homogeneous catalysts include molybdenum naphthenate, sodium tungstate, molybdenum hexacarbonyl, tungsten hexacarbonyl, sodium tungstate and vanadium pentoxide. An exemplary catalyst for the controlled catalytic oxidation of MEROX process by-products DSO is sodium tungstate, $Na_2WO_4 \cdot 2H_2O$. In certain embodiments, suitable heterogeneous catalysts include Ti, V, Mn, Co, Fe, Cr, W, Mo, and combinations thereof deposited on a support such as alumina, silica-alumina, silica, natural zeolites, synthetic zeolites, and combinations comprising one or more of the above supports.

The oxidation of DSO typically is carried out in an oxidation vessel selected from one or more of a fixed-bed reactor, an ebullated bed reactor, a slurry bed reactor, a moving bed reactor, a continuous stirred tank reactor, and a tubular reactor. The ODSO compounds produced in the E-MEROX process generally comprise two phases: a water-soluble phase and water-insoluble phase, and can be separated into the aqueous phase containing WS-ODSO compounds and a non-aqueous phase containing water-insoluble ODSO compounds. The E-MEROX process can be tuned depending on the desired ratio of water-soluble to water-insoluble compounds presented in the product ODSO mixture. Partial oxidation of DSO compounds results in a higher relative amount of water-insoluble ODSO compounds present in the ODSO product and a near or almost complete oxidation of DSO compounds results in a higher relative amount of WS-ODSO present in the ODSO product. Details of the ODSO compositions are discussed in the U.S. Pat. No. 10,781,168, which is incorporated herein by reference above.

Figure 3:
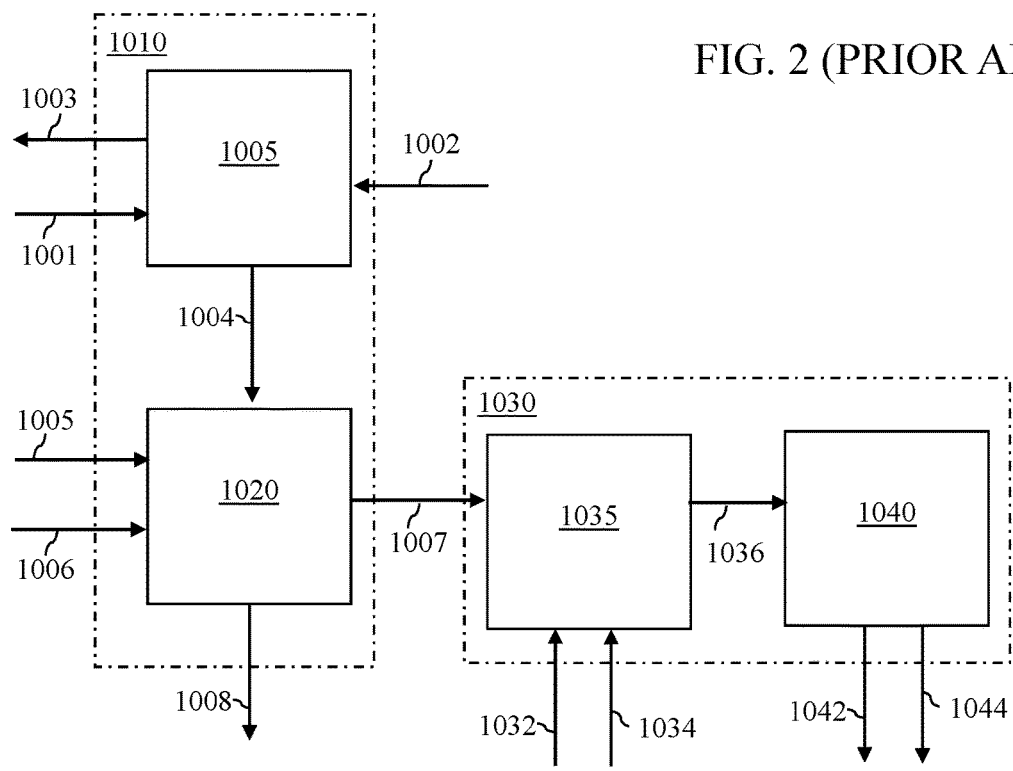
FIG. 3 is a simplified schematic diagram of a generalized version of an enhanced mercaptan oxidation or E-MEROX process.

FIG. 3 is a simplified schematic of an E-MEROX process that includes E-MEROX unit 1030. The MEROX unit 1010 unit operates similarly as in FIG. 2, with similar references numbers representing similar units/feeds. In FIG. 3, the effluent stream 1007 from the generalized MEROX unit of FIG. 2 is treated. It will be understood that the processing of the mercaptan containing hydrocarbon stream of FIG. 2 is illustrative only and that separate streams of the products, and combined or separate streams of other mixed and longer chain products can be the subject of the process for the recovery and oxidation of DSO to produce ODSO compounds, that is the E-MEROX process. In order to practice the E-MEROX process, apparatus are added to recover the by-product DSO compounds from the MEROX process. In addition, a suitable reactor 1035 add into which the DSO compounds are introduced in the presence of a catalyst 1032 and an oxidant 1034 and subjecting the DSO compounds to a catalytic oxidation step to produce the mixed stream 1036 of water and ODSO compounds. A separation vessel 1040 is provided to separate the by-product 1044 from the ODSO compounds 1042.

The oxidation to produce OSDO can be carried out in a suitable oxidation reaction vessel operating at a pressure in the range from about 1-30, 1-10 or 1-3 bars. The oxidation to produce OSDO can be carried out at a temperature in the range from about 20-300, 20-150, 20-90, 45-300, 15-150 or 45-90° C. The molar feed ratio of oxidizing agent-to-mono-sulfur can be in the range of from about 1:1 to 100:1, 1:1 to 30:1 or 1:1 to 4:1. The residence time in the reaction vessel can be in the range of from about 5-180, 5-90, 5-30, 15-180, 15-90 or 5-30 minutes. In certain embodiments, oxidation of DSO is carried out in an environment without added water as a reagent. The by-products stream 1044 generally comprises wastewater when hydrogen peroxide is used as the oxidant. Alternatively, when other organic peroxides are used as the oxidant, the by-products stream 1044 generally comprises the alcohol of the peroxide used. For example, if butyl peroxide is used as the oxidant, the by-product alcohol 1044 is butanol.

In certain embodiments WS-ODSO compounds are passed to a fractionation zone (not shown) for recovery following their separation from the wastewater fraction. The fractionation zone can include a distillation unit. In certain embodiments, the distillation unit can be a flash distillation unit with no theoretical plates in order to obtain distillation cuts with larger overlaps with each other or, alternatively, on other embodiments, the distillation unit can be a flash distillation unit with at least 15 theoretical plates in order to have effective separation between cuts. In certain embodiments, the distillation unit can operate at atmospheric pressure and at a temperature in the range of from 100° C. to 225° C. In other embodiments, the fractionation can be carried out continuously under vacuum conditions. In those embodiments, fractionation occurs at reduced pressures and at their respective boiling temperatures. For example, at 350 mbar and 10 mbar, the temperature ranges are from 80° C. to 194° C. and 11° C. to 98° C., respectively. Following fractionation, the wastewater is sent to the wastewater pool (not shown) for conventional treatment prior to its disposal. The wastewater by-product fraction can contain a small amount of water-insoluble ODSO compounds, for example, in the range of from 1 ppmw to 10,000 ppmw. The wastewater by-product fraction can contain a small amount of water-soluble ODSO compounds, for example, in the range of from 1 ppmw to 50,000 ppmw, or 100 ppmw to 50,000 ppmw. In embodiments where alcohol is the by-product alcohol, the alcohol can be recovered and sold as a commodity product or added to fuels like gasoline. The alcohol by-product fraction can contain a small amount of water-insoluble ODSO compounds, for example, in the range of from 1 ppmw to 10,000 ppmw. The alcohol by-product fraction can contain a small amount of water-soluble ODSO compounds, for example, in the range of from 100 ppmw to 50,000 ppmw.

EXAMPLE

Figure 4A:
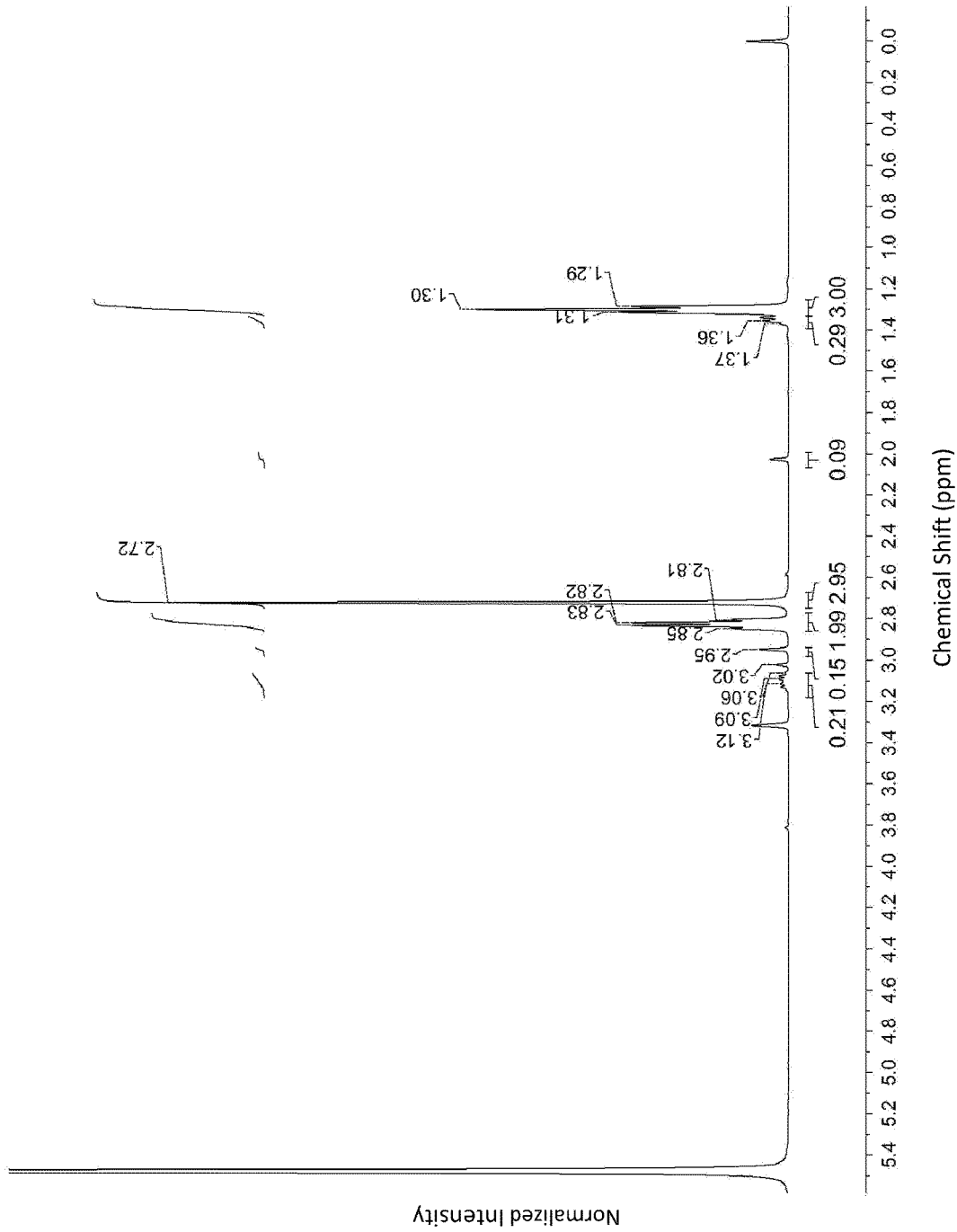
FIG. 4A is the experimental $^1$H NMR spectrum of the WS-ODSO material prior to pH-modification in an Example herein.
Figure 4B:
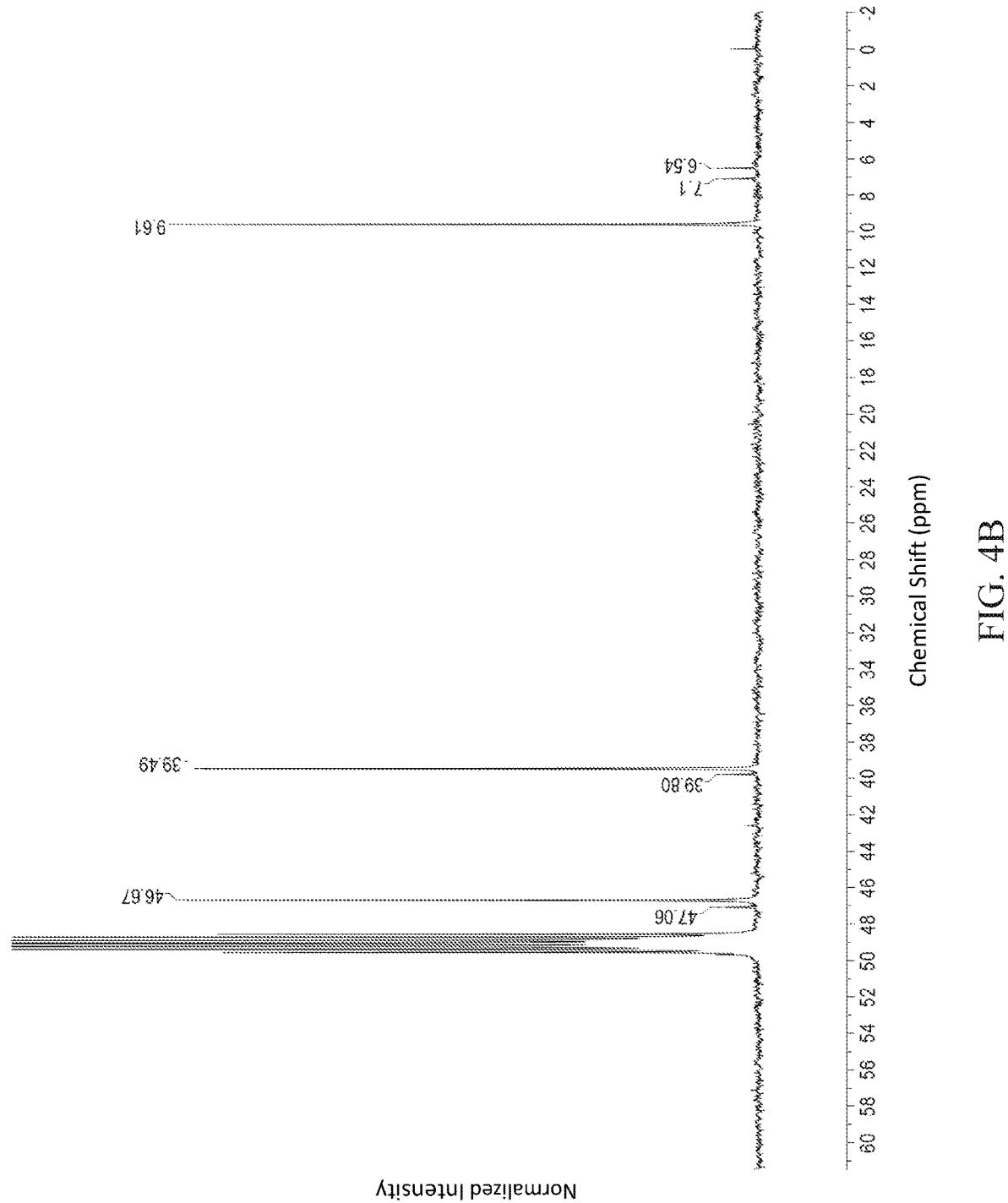
FIG. 4B is the experimental $^{13}$C $\{^1H\}$ NMR spectrum of the WS-ODSO material prior to pH-modification in an Example herein.

Reference Example: The ODSO mixtures used in the Examples below were produced as disclosed in U.S. Pat. No. 10,781,168, incorporated by reference above, and in particular the fraction referred to therein as Composition 2. Catalytic oxidation a hydrocarbon refinery feedstock having 98 mass percent of C1 and C2 disulfide oils per R group was carried out. The oxidation of the DSO compounds was performed in batch mode under reflux at atmospheric pressure, that is, approximately 1.01 bar. The hydrogen peroxide oxidant was added at room temperature, that is, approximately 23° C. and produced an exothermic reaction. The molar ratio of oxidant-to-DSO compounds (calculated based upon mono-sulfur content) was 2.90. After the addition of the oxidant was complete, the reaction vessel temperature was set to reflux at 80° C. for approximately one hour after which the WS-ODSO was produced for use in the examples herein (referred to as Composition 2 in U.S. Pat. No. 10,781,168) and isolated after the removal of water. The catalyst used in the oxidation of the DSO compounds was sodium tungstate. FIG. 4A is the experimental $^1$H NMR spectrum of the polar WS-ODSO mixture used in the example herein prior to pH-modification, and FIG. 4B is the experimental $^{13}$C $\{^1\text{H}\}$ NMR spectrum of the polar WS-ODSO mixture that used in the example herein prior to pH-modification. The selected water soluble ODSO fraction was mixed with a $CD_3OD$ solvent and the spectrum was taken at 25° C. Methyl carbons have a positive intensity while methylene carbons exhibit a negative intensity. The peaks in the 48-50 ppm region belong to carbon signals of the $CD_3OD$ solvent.

When comparing the experimental $^{13}$C $\{^1\text{H}\}$ NMR spectrum of FIG. 4B for the WS-ODSO fraction with a saved database of predicted spectra, it was found that a combination of the predicted alkyl-sulfoxidesulfonate (R—SO—

SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) most closely corresponded to the experimental spectrum. This suggests that alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) are major compounds in the WS-ODSO fraction. It is clear from the NMR spectra shown in FIGS. 4A and 4B that the WS-ODSO fraction comprises a mixture of ODSO compounds that form a WS-ODSO component of a pH-modified composition of the present disclosure.

Figure 5A:
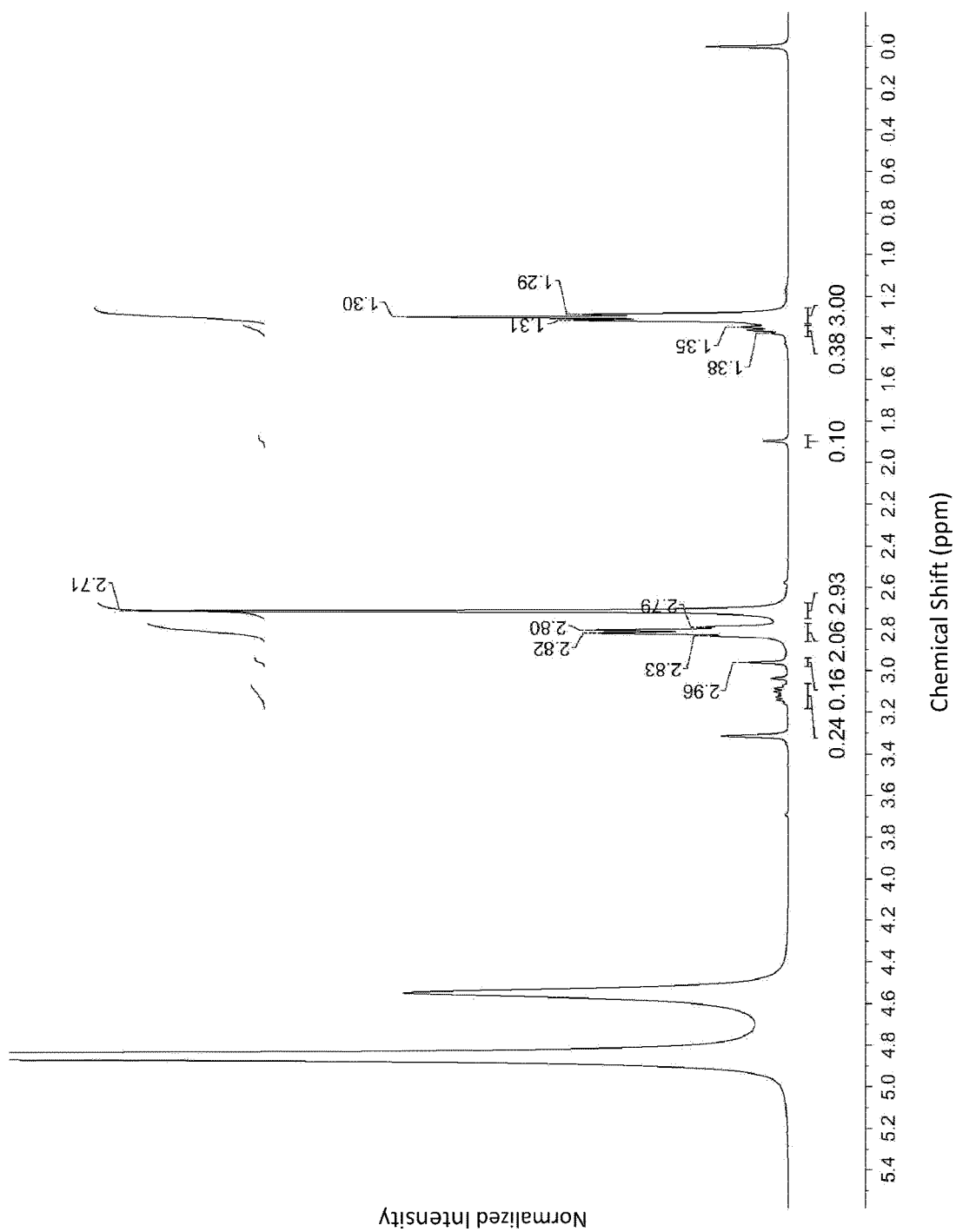
FIG. 5A is the experimental $^1$H-NMR spectrum of a neutralized WS-ODSO fraction in an Example herein.

Example 1: The selected WS-ODSO fraction as described in the Reference Example was neutralized. The selected WS-ODSO tested with pH paper produced by VWR International (VWR International, Radnor, PA, USA) and determined to have a pH of approximately 0 or below. To a quantity of 50.6028 g of this WS-ODSO, an alkaline agent (50 mass percent aqueous NaOH solution) was added slowly whilst measuring the pH. Gas liberation and heat generation were observed. At a pH of approximately 7, a solid was precipitated. FIG. 5A is the experimental $^1$H NMR spectrum of the liquid portion of the neutralized WS-ODSO composition, and FIG. 5B is the experimental $^{13}$C $\{^1$H$\}$ NMR spectrum of the neutralized WS-ODSO composition.

Figure 6:
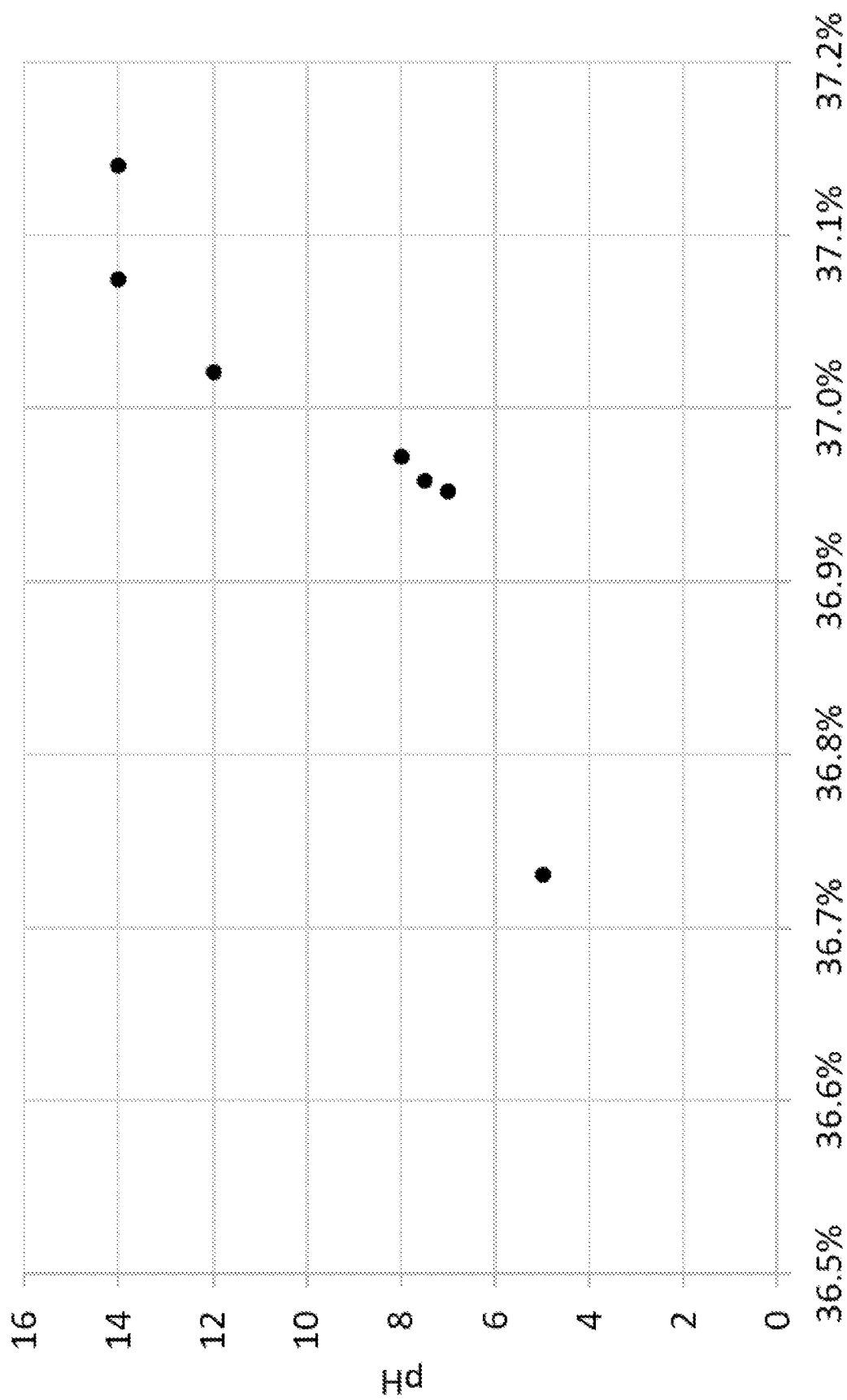
FIG. 6 is a plot of pH as a function of the quantity of alkaline agent in a pH-modified WS-ODSO composition an Example herein.

FIG. 6 is a plot of pH as a function of the mass percent of the NaOH reagent added to the total solution of NaOH reagent and WS-ODSO. This example shows that approximately 36.95 mass percent of 50 mass percent NaOH was required to neutralize the WS-ODSO, or approximately 18.5 mass percent NaOH relative to the total mass of the solution of WS-ODSO and the selected alkaline agent.

Example 2: The neutralized WS-ODSO at pH 7 from Example 1 was separated from the solid. Elemental analysis was performed using Inductively Coupled Plasma (ICP) spectroscopy. Table 2 provides ICP data in the form of the mass percent of Na, S and W in the WS-ODSO mixture before neutralization, the neutralized WS-ODSO at pH 7 and the solid precipitated from the neutralized WS-ODSO at pH 7.

Figure 5B:
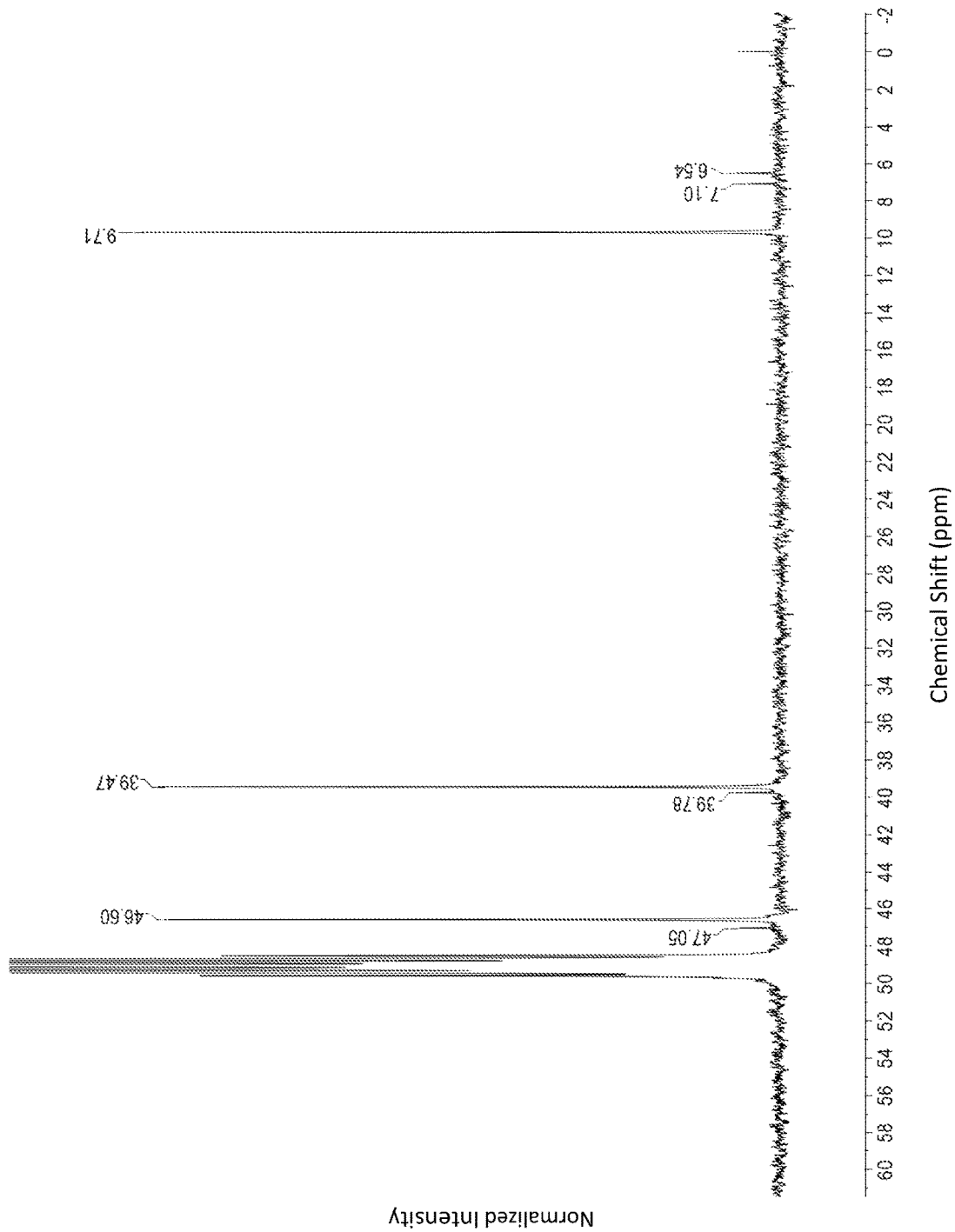
FIG. 5B is the experimental $^{13}$C $\{^1H\}$ NMR spectrum of a neutralized WS-ODSO fraction in an Example herein.

$^1$H and $^{13}$C NMR data were obtained for the WS-ODSO (FIG. 4A, $^1$H NMR spectrum, and FIG. 4B, $^{13}$C $\{^1$H$\}$ NMR spectrum) and for the neutralized WS-ODSO at pH 7 (FIG. 5A, $^1$H NMR spectrum, and FIG. 5B, $^{13}$C $\{^1$H$\}$ NMR spectrum). The samples were prepared in deuterated methanol using a JEOL 500 MHz spectrometer fitted with a 5 mm liquid-state Royal probe. The spectra and data show that the nature of the WS-ODSO components remain unchanged before and after neutralization. Proton NMR spectra and data show that the nature of the WS-ODSO components remain unchanged before and after neutralization, however, there is an observable change in the nature of the hydrogen bonded species. In FIG. 4A concerning the WS-ODSO prior to neutralization, the peak at approximately 5.5 ppm appears to be a coalescence of protons associated with deuterated methanol (the solvent used to measure the samples), water and other species. However, after neutralization (FIG. 5A) there is a clear peak observed at approximately 4.6 ppm that is expected for the protons from the deuterated methanol and a coalesced peak at approximately 4.9 ppm relating to water and other species. Hence, there is a clear difference of interaction between the two samples with the solvent used to measure the NMR data.

Figure 7:
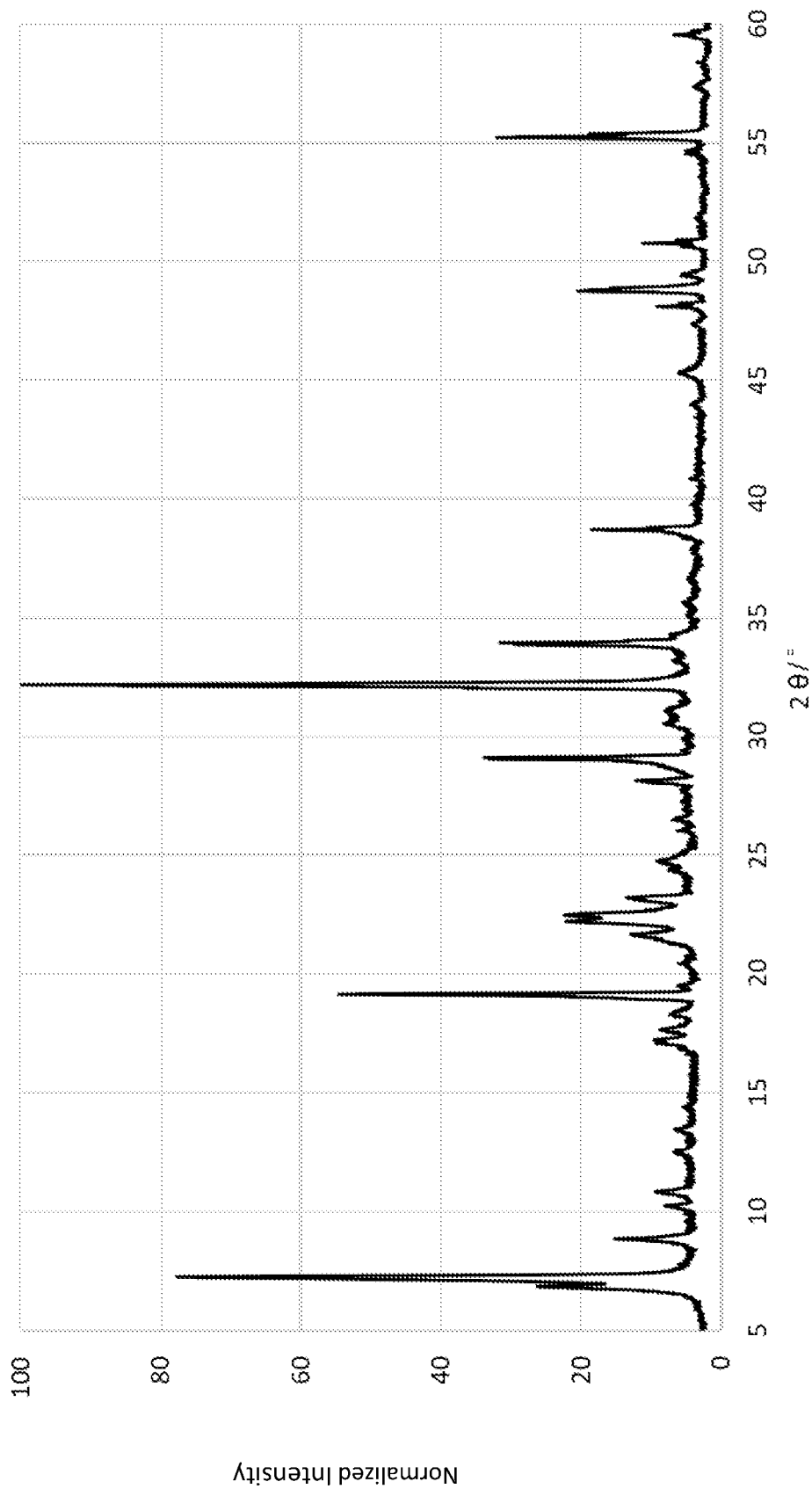
FIG. 7 is an X-ray diffraction pattern of solids precipitated from a neutralized WS-ODSO in an Example herein.

FIG. 7 shows the X-ray diffraction pattern of the solid precipitated from the neutralized WS-ODSO at pH 7. The diffraction pattern shows a complex pattern, indicative of the presence of at least sodium sulfate (a sulfate sodium hydroxide alkaline agent) and carry over catalyst from the oxidation of DSO to WS-ODSO, sodium tungstate.

The Example demonstrates that WS-ODSO can be neutralized to produce a composition with a lower mass percent of atomic sulfur in the pH-modified WS-ODSO as compared to the WS-ODSO prior to neutralization. The pH-modified WS-ODSO can be used in zeolite syntheses at a higher loading level than that of the original WS-ODSO, as disclosed in the above-mentioned co-pending and commonly owned United Stated patent application Ser. No. 17/850,115 filed on Jun. 27, 2022, entitled "Method Of Zeolite Synthesis Including pH-Modified Water-Soluble Oxidized Disulfide Oil Composition," which is incorporated by reference herein in its entirety. It is observed that when using the neutralized WS-ODSO as a component in zeolite synthesis, the added utility water for the zeolite sol-gel can be reduced by 50-100, 75-100 or 90-100 mass percent, and the added mineralizer (for example NaOH reagent) can be reduced by 50-100, 75-100 or 90-100 mass percent, since the neutralized WS-ODSO contains mineralizer (for example Na). Accordingly, the pH-modified WS-ODSO composition herein can be sold as a commodity product or used for in-house syntheses.

The pH-modified WS-ODSO composition described above and characterized in the attached figures are exemplary, and modifications and variations will be apparent to those of ordinary skill in the art and the scope of protection for the invention is to be defined by the claims that follow.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

TABLE 1

| ODSO Name | Formula | Structure Examples | |
|---|---|---|---|
| Dialkyl-sulfonesulfoxide Or 1,2-alkyl-alkyl-disulfane 1,1,2-trioxide | (R—SOO—SO—R') | [structure] | 1,2-Dimethyldisulfane 1,1,2-trioxide |
| Dialkyl-disulfone Or 1,2 alkyl-alkyl-disulfane 1,1,2,2-tetraoxide | (R—SOO—SOO—R') | [structure] | 1,2-Dimethyldisulfane 1,1,2,2-tetraoxide |
| Alkyl-sulfoxide-sulfonate | (R—SO—SOO—OH) | [structure] | Methylsulfanesulfonic acid oxide |

TABLE 1-continued

| ODSO Name | Formula | Structure Examples | |
|---|---|---|---|
| Alkyl-sulfone-sulfonate | (R—SOO—SOO—OH) | [structure] | 1-Hydroxy-2-methyldisulfane 1,1,2,2-tetraoxide |
| Alkyl-sulfoxide-sulfinate | (R—SO—SO—OH) | [structure] | 1-Hydroxy-2-methyldisulfane 1,2-dioxide |
| Alkyl-sulfone-sulfinate | (R—SOO—SO—OH) | [structure] | Methylsulfane-sulfinic acid dioxide |

R and R' can be the same or different C1-C10 alkyl or C6-C10 aryl groups.

TABLE 2

| | Na (wt. %) | S (wt. %) | W (wt. %) |
|---|---|---|---|
| WS-ODSO | 0.07 | 21.90 | 0.28 |
| Neutralized WS-ODSO (liquid) | 9.40 | 13.98 | 0.16 |
| Neutralized WS-ODSO (solid) | 27.14 | 24.59 | 0.12 |

What is claimed is:

1. A composition comprising an aqueous mixture of one or more water-soluble oxidized disulfide oil (WS-ODSO) compounds and an effective amount of an alkaline agent, wherein the composition is a pH-modified WS-ODSO composition having a pH that is higher than a pH of the one or more WS-ODSO compounds.

2. The composition of claim 1, wherein the one or more WS-ODSO compounds is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' can be the same or different C1-C10 alkyl or C6-C10 aryl.

3. The composition of claim 1, wherein the one or more WS-ODSO compounds is selected from the group consisting of compounds having the general formula (R—SOO—SO—R'), (R—SOO—SOO—R'), (R—SO—SOO—OH), (R—SOO—SOO—OH), (R—SO—SO—OH), (R—SOO—SO—OH), and mixtures thereof, where R and R' are alkyl or aryl groups comprising 1-10 carbon atoms.

4. The composition of claim 1, wherein the one or more WS-ODSO compounds comprises a mixture of two or more types of WS-ODSO compounds selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—

SO—SOO—OR) and (R'—SOO—SOO—OR), wherein R and R' can be the same or different C1-C10 alkyl or C6-C10 aryl.

5. The composition of claim 1, wherein the one or more WS-ODSO compounds comprises a mixture of two or more types of WS-ODSO compounds selected from the group consisting of compounds having the general formula (R—SOO—SO—R'), (R—SOO—SOO—R'), (R—SO—SOO—OH), (R—SOO—SOO—OH), (R—SO—SO—OH), (R—SOO—SO—OH), and mixtures thereof, where R and R' are alkyl or aryl groups comprising 1-10 carbon atoms.

6. The composition as in claim 4, wherein the mixture is derived from oxidation of disulfide oil compounds present in an effluent refinery hydrocarbon stream recovered following catalytic oxidation of mercaptans present in a mercaptan-containing hydrocarbon stream.

7. The composition as in claim 1, wherein the alkaline agent has a pH of greater than 7, and less than or equal to 14, and wherein the one or more WS-ODSO compounds have a pH of less than about 7.

8. The composition as in claim 1, wherein the alkaline agent is selected from the group consisting of sodium hydroxide, calcium hydroxide, lithium hydroxide, strontium hydroxide, barium hydroxide, potassium hydroxide, cesium hydroxide, rubidium hydroxide, ammonia, ammonium hydroxide, zinc hydroxide, trimethylamine, pyridine, beryllium hydroxide, magnesium hydroxide, and mixtures comprising two or more of the foregoing.

9. The composition as in claim 1, wherein the alkaline agent is sodium hydroxide.

10. The composition as in claim 1 that is a neutralized WS-ODSO composition having a pH in the range of about 6-8.

11. The composition as in claim 1, wherein the effective amount of the alkaline agent is on a molar equivalent or approximately molar equivalent basis relative to the number of acid sites of the WS-ODSO compounds, and wherein the pH-modified WS-ODSO composition is a neutralized WS-ODSO composition.

12. The composition as in claim 1, wherein the effective amount of the alkaline agent is greater than a molar equivalent relative to the number of acid sites of the WS-ODSO compounds, and wherein the pH-modified WS-ODSO composition is a basified WS-ODSO composition having a pH greater than 7.

13. The composition as in claim 1, wherein the effective amount of the alkaline agent is less than a molar equivalent relative to the number of acid sites of the WS-ODSO compounds, and wherein the pH-modified WS-ODSO composition is a deacidified WS-ODSO composition having a pH less than 7.

14. The composition as in claim 1, wherein all or a portion of water in the aqueous mixture is generated in-situ by reaction of WS-ODSO and alkaline agent.

15. The composition as in claim 6, wherein the oxidation of disulfide oil compounds occurs in the presence of a transition metal catalyst, and wherein the pH-modified WS-ODSO contains transition metal from the transition metal catalyst.

16. The composition as in claim 15, wherein the transition metal catalyst is selected from the group consisting of Mo, W, V, Ti, and combinations thereof.

17. The composition as in claim 1, further comprising one or more one or more metals or metal compounds selected from the Periodic Table of the Elements IUPAC Groups 4-12.

18. The composition as in claim 1, wherein the WS-ODSO contains a first weight percent of atomic sulfur, and the pH-modified WS-ODSO composition contains a lesser weight percent of atomic sulfur than the first quantity of atomic sulfur.

19. The composition as in claim 1, wherein the alkaline agent comprises an alkali metal, the WS-ODSO contains a first weight percent of atomic alkali metal, and the pH-modified WS-ODSO composition contains a greater weight percent of atomic alkali metal than the first quantity of atomic alkali metal.

20. The composition as in claim 1, wherein the alkaline agent has a pH of greater than 7, and less than or equal to 14, and wherein the one or more WS-ODSO compounds have a pH of less than about 4.

21. The composition as in claim 1, wherein the alkaline agent has a pH of greater than or equal to about 8, and less than or equal to 14, and wherein the one or more WS-ODSO compounds have a pH of less than about 7.

22. The composition as in claim 1, wherein the alkaline agent has a pH of greater than or equal to about 8, and less than or equal to 14, and wherein the one or more WS-ODSO compounds have a pH of less than about 4.

* * * * *